Patented Aug. 8, 1933

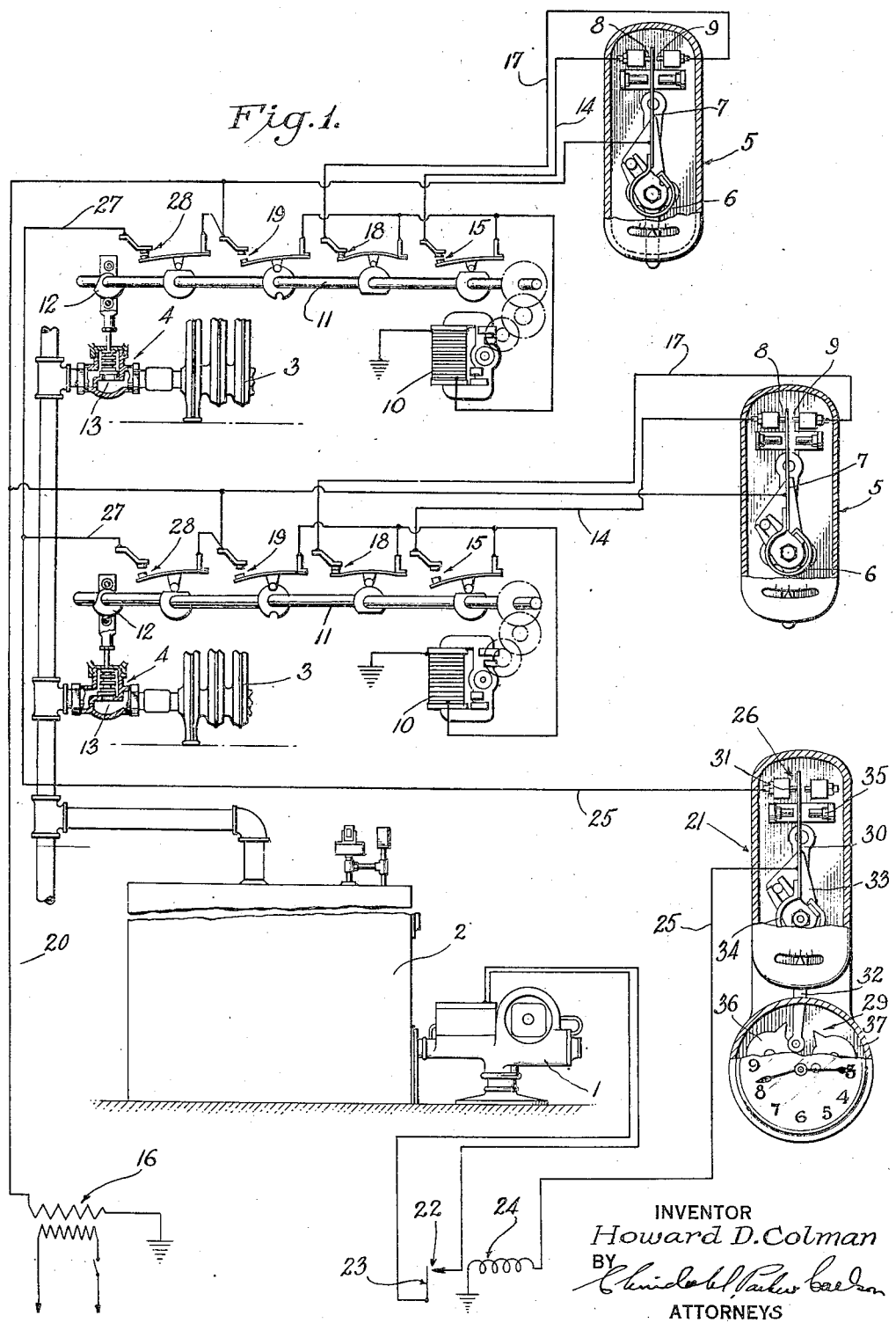

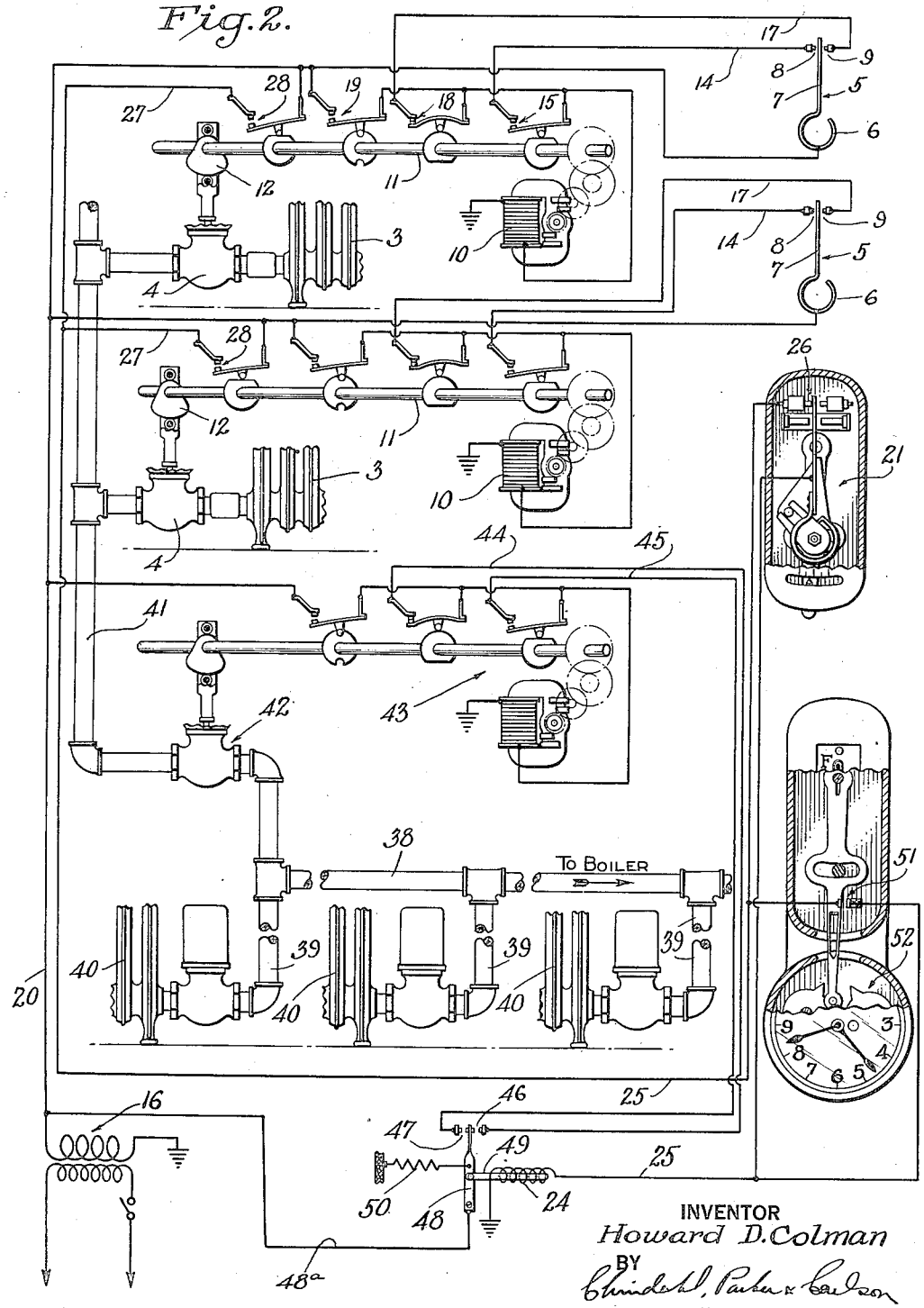

1,921,154

UNITED STATES PATENT OFFICE 1,921,154

TEMPERATURE REGULATING SYSTEM

Howard D. Colman, Rockford, Ill.

Application November 5, 1930. Serial No. 493,493

8 Claims. (Cl. 236—47)

The invention relates to improvements in temperature regulation in buildings and more particularly to a system of the class in which economy in fuel consumption is effected by thermostatically maintaining the different rooms of the building at a uniform lower temperature during the night time when the rooms are ordinarily unoccupied than is maintained during the day.

In prior systems of this class, the supply of heat to different rooms has been controlled during both day and night by individual room thermostats arranged to be adjusted simultaneously from a central point for the maintenance either of the day temperature or of the lower night temperature. In addition to requiring specially constructed and more elaborate control apparatus in each room, complicated pneumatic piping arrangements or electric wiring extending through all of the rooms is required in order to change from day to night control or vice versa.

Systems of the above character generally provide for the same accuracy in the maintenance of the night temperature as of the day temperature, but such close regulation is actually unnecessary in order to effect the desired fuel saving. Advantage is taken of this fact in the present invention, the general object of which is to minimize the equipment, installation and maintenance costs of a two-temperature control system.

More specifically stated, the invention aims to provide in combination with the heating system of a building, a novel master control common to the heat regulating means for a plurality of different rooms and arranged to regulate thermostatically the heat supply to all of such rooms during the night while permitting of individual regulation of heat admission to the different rooms during the day under the control of thermostats in the respective rooms.

The invention also resides in the novel manner in which the master thermostatic control is utilized to vary automatically the flow of heating fluid from the primary source of supply during the night.

Another object is to provide novel means for rendering the master thermostat operative for night control and inoperative during the day.

Other objects and advantages of the invention will become apparent from the following detailed description taken in connection with the accompanying drawings in which:

Figure 1 is a schematic view of a heating system equipped with a thermostatic control embodying the features of the present invention.

Fig. 2 is a similar view showing the invention in another form.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring first to Fig. 1, the heating system in which the present invention is embodied for purposes of illustration is of the type in which heat, supplied by a primary source such as a fuel oil burner 1 for heating fluid in a boiler 2, is conveyed by the fluid through a system of piping and thereby distributed to heat supplying devices such as radiators 3 located in different parts of the building. Herein the radiation of heat to the air in the different rooms is interrupted or resumed by closing and opening radiator inlet valves 4.

Operation of each valve, or in some instances a group of valves, is controlled by a thermostat 5 individual to each room or other unit of the building. These thermostats are of well-known construction embodying a thermoresponsive element 6 which moves a tongue 7 back and forth between two contacts to alternately open and close switches 8 and 9 as the room temperature rises above or falls below the predetermined value for which the thermostat is set. This temperature usually ranges from 70 to 75 degrees F.

In the present instance, each thermostat acts through the medium of a power driven operator including an electric motor 10 operating through suitable gearing to effect unidirectional rotation of a two-position shaft 11. In successive half-revolutions of the shaft, a cam 12 thereon alternately seats and unseats a valve member 13. The cycle of motor operation which closes the valve is initiated by closure of the thermostat switch 8 which is in a circuit 14 controlled by a cam-operated switch 15 and supplied with alternating current from a source 16. A similar circuit 17 including a switch 18 governs the valve-opening cycle in response to closure of the thermostat switch 9. Both of the cycles are terminated by opening a switch 19 in a maintaining circuit between the main power conductor 20 and the motor.

The present invention contemplates the maintenance of the different rooms of the building at an average night temperature by interrupting and resuming the flow of heating fluid to all of the rooms according to the combined demands in such rooms as determined by a single master thermostat 21 located at a representative point within the rooms and arranged to permit the radiation of heat to the respective rooms to be regulated individually during the daytime by the thermostats 5. To this end, a switch 22, the closure and opening of which initiates and interrupts the operation of the oil burner 1 and therefore the supply of heated fluid to the distributing system as a whole, is arranged to be closed by movement of an armature 23 when a magnet 24 is energized and likewise to be opened upon deenergization of the magnet.

One terminal of the magnet winding is grounded and thereby connected to the current source 16. From the other terminal, a conductor 25, having a switch 26 of the master thermostat 21 interposed therein, is extended throughout the different rooms and is connected to the return power conductor 20 through the medium of a plurality of parallel branch conductors 27. There is one of these branches for each thermostat 5 and each has interposed therein a switch 28 incorporated in a valve operator and arranged to be closed and opened when the camshaft 11 of the operator is in valve-open and valve-closed positions respectively. Therefore, the condition of each switch 28 is indicative of the position of its controlling thermostat 5, that is whether the thermostat is or is not calling for heat.

The result of the above arrangement is that when all of the room thermostats cease to call for heat, all of the switches 28 will be open and the magnet 24 will be maintained deenergized, thereby preventing operation of the oil burner. Closure of any one of the switches 28, as an incident to the call of its associated room thermostat for heat by opening the radiator valve, will complete the magnet circuit and thereby close the switch 22 causing the oil burner to start unless otherwise prevented by some auxiliary control (not shown) such as is commonly provided to limit the fluid temperature in the boiler 2 to a predetermined safe maximum. In this way, the control of the primary heat source and therefore the flow of heated fluid to the distributing system as a whole is placed under the joint control of the individual room thermostats so long as the master thermostat switch 26 is maintained closed, as is normally the case during the daytime. Thus, during the daytime a substantially continuous supply of heated fluid is available for use by the different room radiators but unnecessary operation of the primary source of heat when there is no demand by any of the room thermostats is effectually prevented.

With the switch 26 interposed in the conductor 25 and thereby made common to all of the branches 27 which control the magnet 24, the control circuit may be interrupted and the burner operation discontinued even though all of the switches 28 are closed as would be the case when all of the room thermostats are calling for heat. The master thermostat 21 is utilized for effecting such control of the energizing circuit, and is adapted, when placed in active control, to respond to a temperature lower than that for which the room thermostats are set so that the supply of heated fluid to the pipes leading to the different room radiators is regulated according to the requirements in an average room of the building whereby the air in all of the rooms will be maintained at an average temperature, approximating that for which the master thermostat is set. The night temperature to be maintained will, of course, vary with the character of the heating installation, the season of the year, etc. and may range from ten to twenty-five degrees F. below the day temperature.

The master thermostat 21 may be of the same simple construction as the room thermostats 5 having its tongue 30 and one stationary contact 31 which form the switch 26 connected to portions of the conductor 25 and arranged to be opened and closed respectively upon a rise in temperature above or a fall below that predetermined by the setting of the thermostat. This setting is determined by the position of a laterally swingable lever 32 whose movement is transmitted through a lever 33 to change the position of the thermo-sensitive element 34 and tongue 30 relative to the contacts 31. A magnetic set device 35 of the type forming the subject matter of a copending application of Duncan J. Stewart, Serial No. 452,911, filed May 16, 1930, may be employed to prevent chattering of the contacts of the switch 26 due to vibration or other causes.

Assuming that the master thermostat is set to respond to a temperature of 60 degrees F. and that when the thermostat is placed in control of the magnet circuit, the air temperature in the rooms, and therefore that to which the master thermostat is exposed, is 70 degrees F. In such a case, some of the room thermostats may be calling for heat but would be ineffective to initiate operation of the burner because the temperature is above that for which the master thermostat is set. Thus the magnet circuit would be interrupted by the switch 26 and the primary source of heat would remain shut off until the average temperature throughout the building as determined by the master thermostat falls below 60 degrees F. Closure of the switch 26 completes the magnet circuit which will otherwise be complete by reason of the fact that all or at least one of the switches 28 will be closed. The burner is thus started and heated fluid will be supplied to all of the radiators 3 and admitted to the air in the rooms because the valves 4 will be open at the existing low temperature. The burner operation will continue until the air to which the master thermostat is exposed and the average temperature throughout the building or portion thereof under night control has been heated to 60 degrees, whereupon the switch 26 will be opened and the burner operation interrupted. Such operation of the burner will be continued intermittently throughout the night with the result that an average temperature of 60 degrees will be maintained.

It will be noted that by arranging the switches 28 in parallel relation, as distinguished from the series relation, the resistance of the magnet circuit due to voltage drops at switches is reduced to a minimum with the result that the circuit can be operated at low voltage and the burden on the thermostat switch 26 accordingly reduced. Another advantage of the parallel arrangement is that the operation of the night thermostat will not be interfered with in the event that one of the valves 4 is maintained closed by an abnormally low setting of its controlling thermostat 5 or for other causes that might arise.

The master thermostat may be rendered effectual or restored to control either manually or automatically and by various types of means. In the form shown in Fig. 1, this is accomplished by changing the setting of the thermostat. That is to say, during the daytime when the master thermostat is out of control, it is set to respond to a higher temperature than the thermostats 5, for example of 80 degrees F. Thus, the switch 26 will be maintained closed and the heat source regulated solely by the combined action of the room thermostats. At night the adjusting lever 32 is shifted in a direction to set the master thermostat for response to the predetermined night temperature which, of course, is below the temperature to which the room thermostats respond. Thus when the requirement for heat is relatively low, the master thermostat is placed in active control, and when in such control acts independently of the room thermostats to interrupt and resume the supply of heat to the distributing system.

Changing the setting of the master thermostat affords a simple way of rendering the night thermostat effectual and ineffectual and may also be effected automatically by means of a clock-actuated mechanism 29 of well-known construction having a cam member 36 arranged to shift the adjusting lever 32 of the thermostat into day position at the desired hour in the morning, such setting of the thermostat being frictionally maintained in the usual way. At the proper time in the evening, another cam 37, operated by the clock mechanism, shifts the lever 32 into night position, thereby placing the master thermostat in control of the primary heat source.

Figure 2 illustrates the invention applied to the control of a different type of means for regulating the supply of heat from a primary heat source to enable any part of the building to be placed under two-temperature control while the remaining rooms are maintained at the same temperature during the day and night. In this distributing system, a substantially continuous supply of fluid heated by a burner (not shown) is maintained available at a main feed pipe 38 from which it is distributed through branch headers 39 to the radiators 40 in the rooms not subject to the two-temperature control. The flow of the fluid to a pipe 41 feeding the radiators 3 in the rooms to be maintained at lower night temperatures is governed by a valve 42 which therefore constitutes means for regulating the delivery of heat from the primary source of supply to the radiators 3, the radiation from which is controlled during the daytime by thermostats 5 as above described in connection with the system shown in Fig. 1.

The valve 42 is intended to be opened and closed intermittently during the night under the control of the master thermostat 21 which, of course, is located so as to respond to the representative temperature of the air in that portion of the building heated by the radiators 3. To this end, the valve is equipped with a power operator 43 similar in construction and mode of operation to the operators for the valves 4. The starting circuits 44 and 45 are controlled by switches 46 and 47 interposed therein and having a common actuating member 48 connected to the armature 49 of the magnet 24 and biased by a spring 50 in a direction to maintain the switch 47 closed when the magnet 24 is deenergized. Current is supplied to the starting circuits through a conductor 48ª connecting the member 48 and the power line 20.

The magnet winding is arranged to be controlled, as in the system first described, by the joint action of the valve-operated switches 28 and the master thermostat switch 26. Thus, upon closure of the switch 26 when any one or more of the switches 28 is closed, the magnet becomes energized thereby closing switch 46 which initiates the operation of the operator 43 to open the valve 42 and permit the flow of heated fluid to the valves 4. When the rooms have been heated to the required night temperature, the master thermostat interrupts the magnet circuit causing the valve 42 to be closed, thereby discontinuing the supply of fluid to those rooms which are under the two-temperature control.

In the case of the system shown in Fig. 2, the master thermostat is placed within control at night and rendered ineffectual during the day by opening and closing of a switch 51 in parallel with the terminals of the master thermostat switch 26. During the daytime, the switch 51 is held closed thereby maintaining a short circuit around the switch 26 which renders the master thermostat ineffectual and places the valve 42 within the control of the switches 28. At night a suitable clockwork 52 operates to open the switch 51 which places the energizing circuit of the magnet 24 under the control of the master thermostat 21. Then at the proper time in the morning, the clockwork again closes the switch 52 thereby restoring the day control. The advantage of this method of shifting from day to night control and vice versa is that it enables the setting of the master control thermostat to be changed readily for the maintenance of any desired night temperature.

From the foregoing, it will be apparent that a two-temperature control has been provided simply by the addition to an ordinary individual room control system of the single master control thermostat and the simple means for rendering the master control effectual and ineffectual. The principal aim of two-temperature control systems is thus attained at a material saving in equipment, installation and maintenance costs which remain the same regardless of the number of individual room controls involved. Moreover, the control of the primary heat source by the master thermostat is advantageous in that it avoids the maintenance during the night of a supply of heat to the several points of the building as would be necessary in case of control of distribution by the room thermostats.

I claim as my invention:

1. In a heating system, the combination of a plurality of heat regulating devices arranged to govern the supply of heat to different parts of a building, means to deliver heat to said devices from a primary source of supply, a plurality of thermostats each controlling one of said devices, a plurality of electric circuits each individual to one of said thermostats and having a switch therein which is closed when the associated thermostat is calling for heat and open when the thermostat ceases to call for heat, a magnet having a winding common to said circuits and adapted when energized to resume the supply of heat from said primary source and when deenergized to interrupt such supply, and a master thermostat normally ineffective during the daytime and adapted when rendered effective to respond to a temperature lower than the normal temperature for which said first-mentioned thermostats are set to respond, said master thermostat, when effectual, acting to interrupt the magnet circuit upon a rise in temperature above said lower value and to close the circuit upon a fall below such value.

2. In a heating system, the combination of a plurality of heating radiators arranged in different parts of a building, means providing a primary source of heated fluid for said radiators, a plurality of thermostats each controlling the radiation of heat from one of said radiators, a magnet adapted to govern the supply of heated fluid from said primary source, means providing an energizing circuit for said magnet arranged to interrupt the supply of heated fluid when all of said thermostats cease to call for heat and to permit resumption of said supply when any one thermostat calls for heat, an auxiliary thermostat located in a representative part of said building and responsive to a temperature lower than that for which said first mentioned thermostats are normally set to respond, said auxiliary thermostat acting to render said circuit ineffectual upon detection of a temperature above said lower value and to render the circuit effectual upon a decrease in temperature below such value, and means by which said auxiliary thermostat may be withdrawn from control during the daytime and restored to control during the night.

3. In a heating system for a building, the combination of means providing a primary source of heated fluid, a plurality of thermostats individually controlling the supply of heat from said source to different parts of the building, means controlled by the joint action of said thermostats and acting to interrupt the supply of heated fluid to said parts when all of the thermostats cease to call for heat and to permit resumption of such supply when any one thermostat calls for heat, a master thermostat exposed to the air heated by said system and adapted to respond to a temperature lower than said first-mentioned thermostats, said master thermostat, when placed in operative control of the system, acting to render said first-mentioned means ineffectual and effectual respectively upon a rise of the temperature above or a fall thereof below said lower value, and time-controlled means by which the control of said system may be withdrawn from or restored to the master thermostat.

4. In a system for heating a building, the combination of means providing a primary source of heated fluid, a plurality of thermostats respectively located in different rooms of the building and acting jointly to control the supply of heated fluid by said source and individually to regulate the admission of heat to said rooms whereby to maintain day temperatures therein predetermined by the setting of the respective thermostats, a master thermostat responsive to the temperature within the building and adapted, when set to respond to a lower temperature than said room thermostats, to take control of said primary heat source to the exclusion of the room thermostats whereby to regulate the supply of heat to said rooms as a single unit and maintain said lower temperature therein, and clock-controlled means acting automatically at proper time intervals to change the setting of said master thermostat from said lower temperature to a temperature higher than that at which said room thermostats are normally set to respond and vice versa.

5. In a system for heating a building, the combination of means providing a primary source of heat, a plurality of thermostats respectively located in different rooms of the building and acting jointly to control the operation of said means and individually to regulate the admission of heat to said rooms whereby to maintain day temperatures therein predetermined by the setting of the respective room thermostats, and a master thermostat adapted when operative to regulate the operation of said first-mentioned means to the exclusion of said room thermostats and maintain the rooms at a lower night temperature predetermined by the setting of the master thermostat.

6. In a system for heating a building, the combination of means providing a primary source of heat, a plurality of thermostats respectively located in different parts of the building and during the daytime acting jointly to regulate the operation of said heat source and individually to regulate the supply of heat to the respective parts of the building, and a master thermostat responsive to the air temperature at an average point in the building and acting during the night to regulate the operation of said heat source to the exclusion of said first mentioned thermostats.

7. A temperature regulating apparatus, comprising in combination, with a primary source of heat and a system for conveying heat supplied by said source to different points within a building, a device for regulating the supply of heat from said source to said system, a master thermostat located at a representative point within the building, means by which said master thermostat may be placed within and withdrawn from control of said device at different times, and means including a plurality of individually operable thermostats acting when the master thermostat is withdrawn from control to interrupt and resume the transfer of heat from said system to the different points aforesaid in accordance with temperatures determined by the setting of said plurality of thermostats, said master thermostat when in active control of said device responding to a temperature lower than the individual thermostats and acting independently thereof to interrupt and resume the supply of heat to said system for distribution according to the heating requirements determined by the master thermostat.

8. In a heating system, the combination of a plurality of heating devices disposed in different parts of a building, a plurality of thermostats each controlling one of said devices to interrupt and resume the supply of heat thereby in accordance with the temperature changes of the air surrounding such device, means containing a body of heating fluid and adapted to convey the same to all of said devices, a burner adapted to heat said fluid, and a master thermostat located at a representative point within said building and adapted to respond to a temperature lower than said first mentioned thermostats, said master thermostat being ineffectual during the daytime and placed within direct control of said burner during the night whereby to interrupt and resume the operation of the latter when the temperature within the building rises above and falls below that for which said master thermostat is set to respond.

HOWARD D. COLMAN.